March 24, 1925.
M. H. ROBERTS
LOCOMOTIVE BOOSTER
Filed Sept. 16, 1922
1,530,520
3 Sheets-Sheet 1
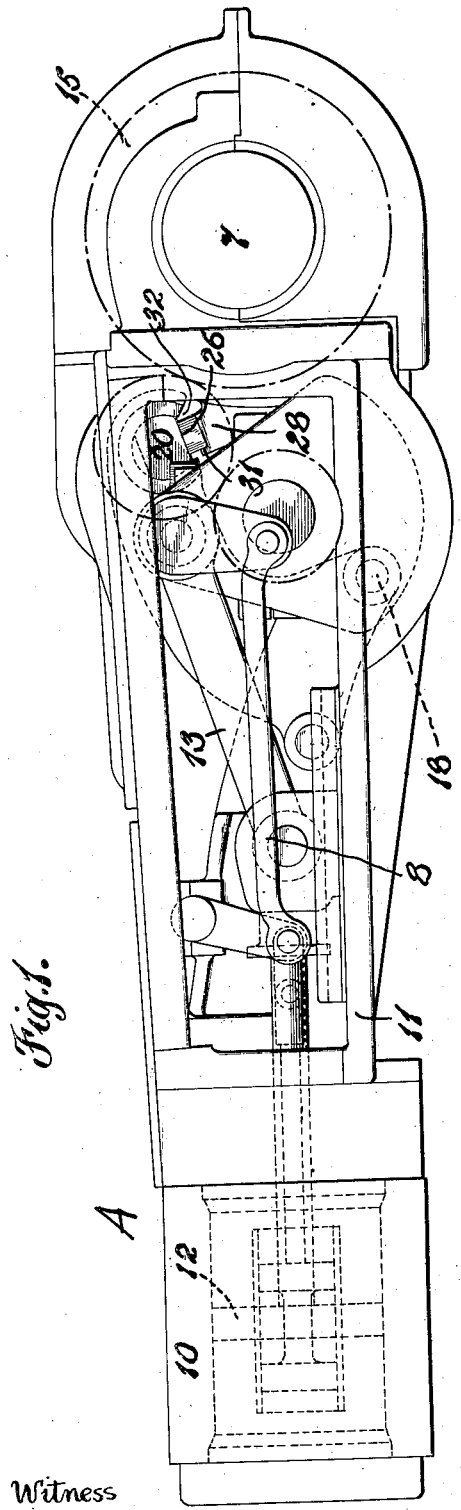
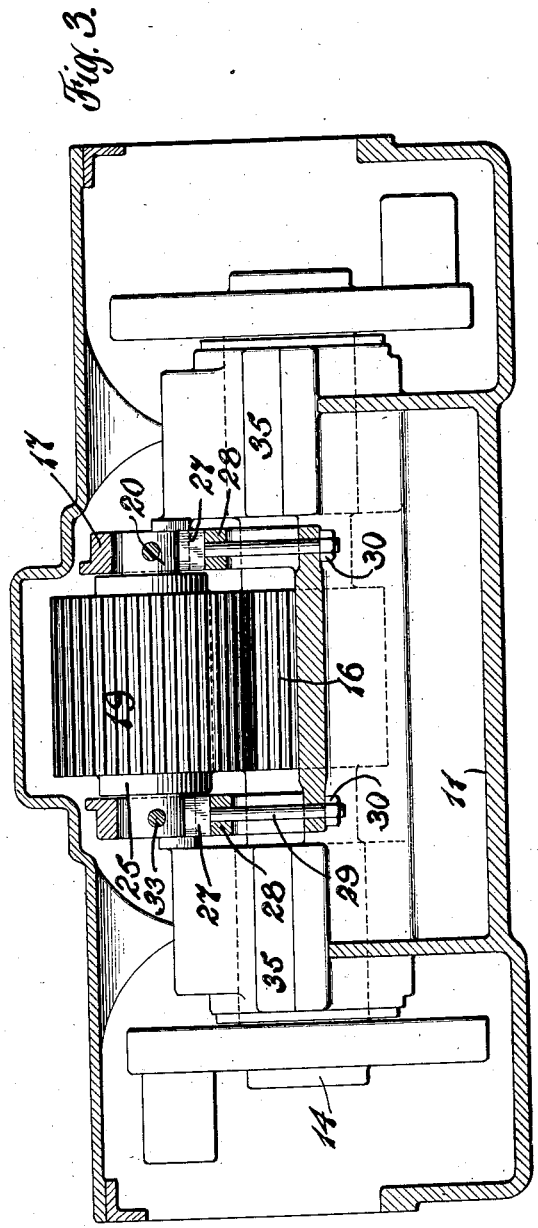

March 24, 1925.　　　M. H. ROBERTS　　　1,530,520
LOCOMOTIVE BOOSTER
Filed Sept. 16, 1922　　　3 Sheets-Sheet 2

March 24, 1925.                    M. H. ROBERTS                    1,530,520
                                  LOCOMOTIVE BOOSTER
                                 Filed Sept. 16, 1922            3 Sheets-Sheet 3

Witness
Gustav Genzlinger

Inventor
Montague H. Roberts
By Attorneys

Patented Mar. 24, 1925.

1,530,520

UNITED STATES PATENT OFFICE.

MONTAGUE H. ROBERTS, OF ENGLEWOOD, NEW JERSEY, ASSIGNOR TO FRANKLIN RAILWAY SUPPLY COMPANY, A CORPORATION OF DELAWARE.

LOCOMOTIVE BOOSTER.

Application filed September 16, 1922. Serial No. 588,560.

*To all whom it may concern:*

Be it known that I, MONTAGUE H. ROBERTS, a citizen of the United States, residing at Englewood, in the county of Bergen and State of New Jersey, have invented certain new and useful Improvements in Locomotive Boosters, of which the following is a specification.

This invention relates to locomotive boosters and particularly to the clutch or entraining mechanism for throwing the booster into and out of operation.

One of the primary objects of my invention resides in the provision of an improved arrangement in which the gears are caused to work on the proper pitch line and binding of the gears is prevented.

Another object of the invention resides in the provision of a novel and improved arrangement of parts whereby heavy and cumbersome bearings heretofore used may be dispensed with and compactness obtained; and in which certain of the clutch parts are relieved of stress or thrust during operation of the booster.

Among other objects of the invention are the provision of an improved arrangement whereby assembly is facilitated; and wherein provision for wear is made.

Figure 2:
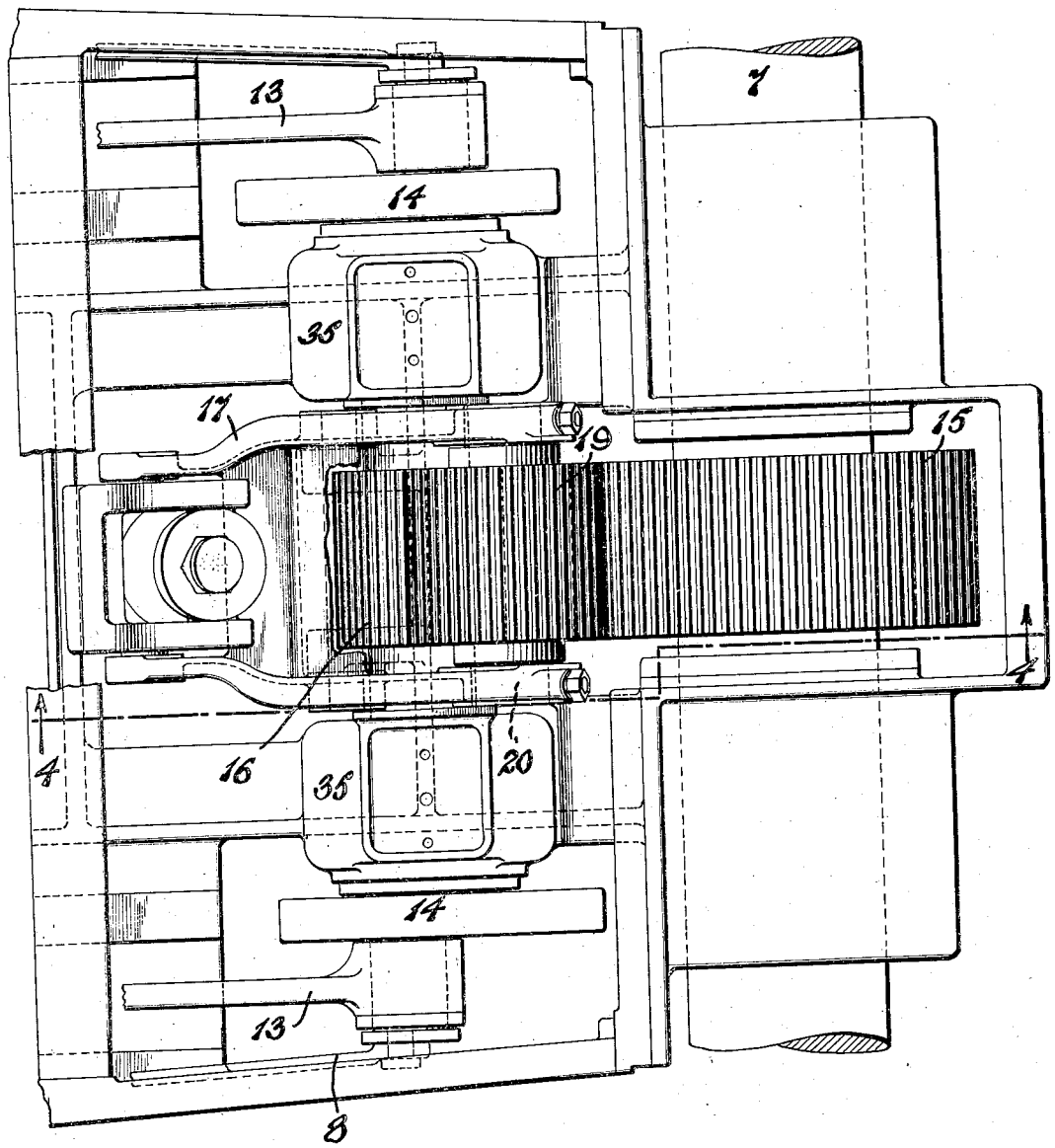
Figure 4:
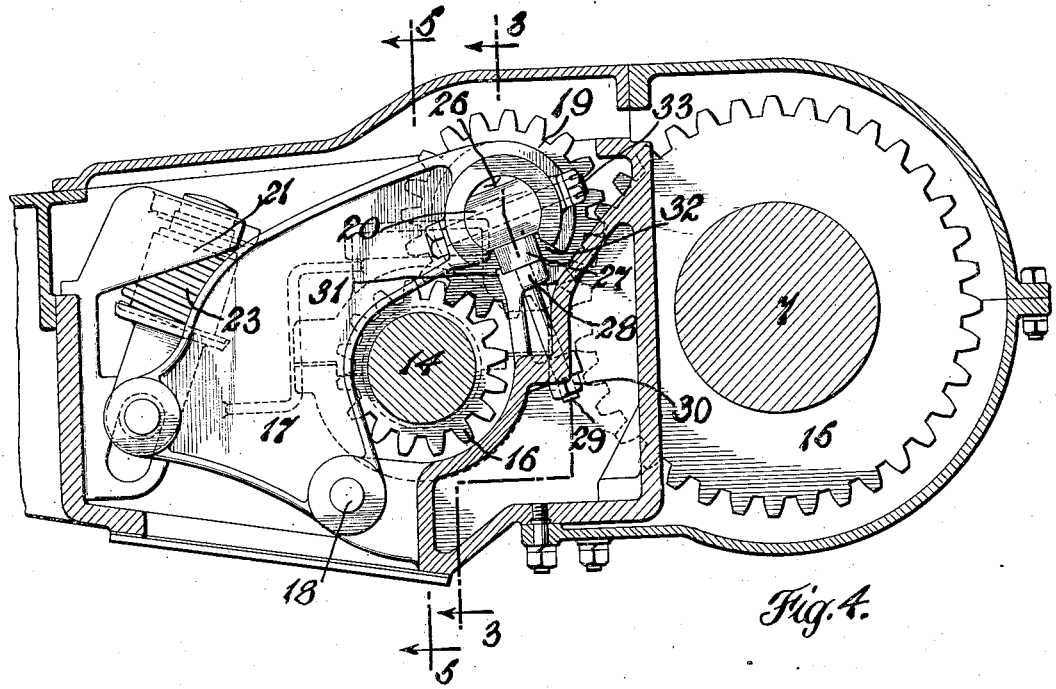
Figure 5:
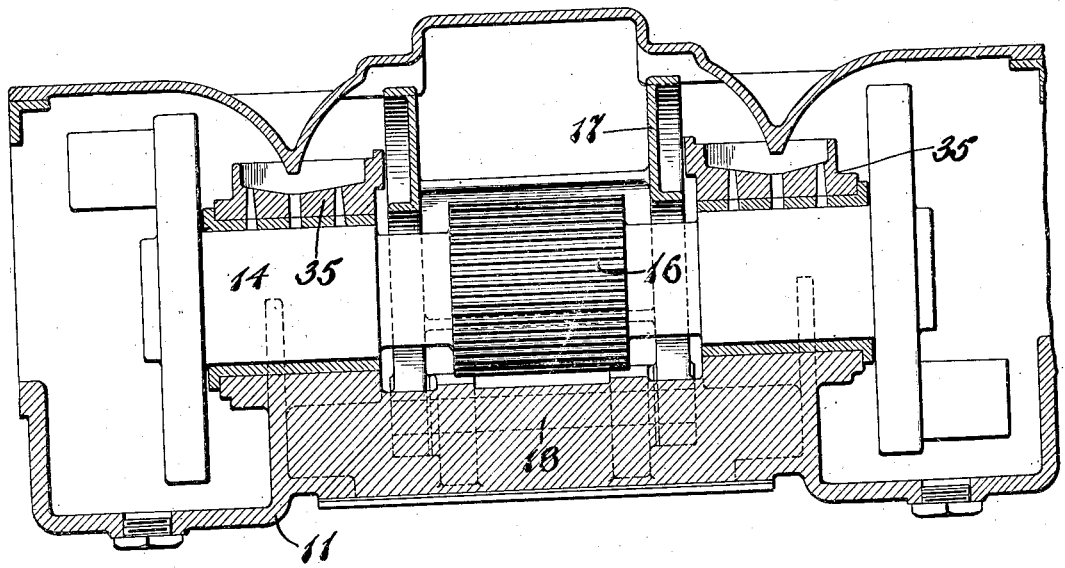

The foregoing, together with such other objects as may hereinafter appear, or are incident to my invention, I obtain by means of a construction, the preferred form of which I have illustrated in the accompanying drawings, wherein, Fig. 1 is a side view of a booster engine embodying my improvements, as applied to a trailer truck axle; Fig. 2 is an enlarged plan of a portion of the booster with the cover plate removed; Fig. 3 is a sectional view on the line 3—3 of Fig. 4; Fig. 4 is a section taken on the line 4—4 of Fig. 2; and Fig. 5 is a section on the line 5—5 of Fig. 4.

Referring now to Figs. 1 and 2, particularly, the reference numeral 7 designates the trailer truck axle having the usual wheels (not shown) and carried in a trailer truck frame (not shown). The booster, indicated as a whole by the reference letter A, comprises the cylinders 10; the casting or bed plate 11; the pistons 12; connecting rods 13; and crank shafts 14. The valve motions are shown at 8.

Referring now to Figs. 2 to 5, in association with Fig. 1, it will be seen that the axle 7 is provided with a gear 15 and the crank shaft 14 is provided with a gear 16. The clutch mechanism establishing a driving connection between the gear 16 and the driven gear 15 includes a forked rocker member 17, suitably pivoted to the bed plate as by means of the pin 18, and the idler gear 19 rotatably carried on the shaft or pin 20 mounted in the arms of the rocker, as will be further explained. Any suitable means may be employed for shifting the rocker 17 to throw the idler gear 19 into and out of mesh with the gears 16 and 15 but in the present instance I have shown a cylinder and piston mechanism 21, the rocker being normally held in disentraining position by means of the spring 23. By this arrangement the clutch parts are normally yieldingly held in inoperative position and when it is desired to use the booster as a driving element, pressure is admitted to move the piston upwardly thereby entraining the gears.

One of the difficulties heretofore encountered in apparatus of this character has been that the space limitation imposed by standard trailer truck practice has made it very difficult to find space for the very large bearings required for the idler gear axle. Another difficulty has been that the rocker pin 18 has been subject to a very heavy thrust during operation of the booster. Still another difficulty has been that the idler gear 19 tends to crowd down between the gears 16 and 15, the resultant of the forces being in that direction, and binding of the gears has frequently occurred. I overcome these difficulties in the following manner:

Instead of having the idler axle or pin 20 live, I provide a bushing 25 for the idler gear and permit it to rotate with respect to the pin. The ends of the pin 20 are flatted, as indicated at 26, and stops are provided at the opposite ends of the pin adapted to take the down thrust, resultant of the forces set up in operation. In the present embodiment this stop mechanism consists of the hard steel blocks 27 secured to suitable seats 28 formed on the bed plate by means of the pins 29 and nuts 30. It will be seen that when the gears are entrained that the flatted portions of the pin 20 seat themselves on the stops 27, the parts being so designed that the idler gear is limited against further downward movement and the gears run on the proper pitch line. It will also be noted that shoulders 31 are provided on the seats 28 so that the stops 27 are supported against thrust in the direction of the pin 18, and thus the whole stop arrangement is one such as will relieve the pin 18 of any thrust or load during operation. At the same time the pins or bolts 29 are relieved of any tendency toward shearing stresses and become simply holding members for the stops 27.

By making the pin 20 a dead member and taking the thrust on it, it will be seen that I obviate the necessity for the large and cumbersome bearings heretofore necessary in the clutch devices for locomotive boosters of this character, and in addition I am enabled to greatly reduce the size and weight of the rocker. In fact, the rocker arm 17 need be made strong enough only to withstand whatever load there may be in pulling the idler gear out of mesh and it is necessary to design the pin 20 of sufficient strength only to withstand the load imposed during operation.

In addition to the foregoing, the construction is advantageous in that it is possible to use "mutilated" eyes 32 in the rocker arm, i. e., eyes open at the bottom, the pin being inserted by turning it at right angles to the position shown in Fig. 4, in which position the flatted ends of the pins can be inserted in the openings in the eyes 32. When the pin is rotated in the position shown in Fig. 4, it will, of course, be held in place in the eyes 32, the bolt 33 being simply provided to prevent accidental rotation and dislodgment of the pin when the gears are not entrained. These bolts also serve to prevent spreading of the ends of the eyes, although this function is a negligible one since the only thrust imposed on the eyes is that incident to disentraining the gears which, of course, is very small.

In addition to the advantage of obviating the necessity of large bearings, the arrangement is further advantageous in that it makes the part easy to assemble and at the same time makes it possible to bring the center of the pin 20 nearer to the line cutting the centers of the crank shaft 14 and the axle 7, that is to say, it makes it possible to use idler gears of smaller diameter which is of great practical importance and advantage, not only from the standpoint of design but also because of the confined space within which the parts must be accommodated.

Under service conditions when some relative lateral movement of the axle 7 occurs, lateral thrust would be imparted by gear 15 to gear 19 (by virtue of the frictional grip therebetween) and thereby to the rocker 17 and pin 18. To meet this condition, the bearings 35 for the crank shaft 14 and the rocker arms are so disposed that one or the other of the latter, as the case may be, will come into abutment with the respective bearing on lateral motion, such bearing forming a stop or support for the rocker preventing transmission of lateral thrust to the pin 18.

Other advantages will occur to those familiar with the art. No specific claim is made herein to the oiling arrangement nor to the disposition of the valve motions shown.

What I claim is:

1. In a locomotive booster, a load carrying axle and its wheels, a gear on said axle, a driving gear, a booster motor for operating said driving gear, an entraining idler gear, and means in the line of thrust of the idler gear whereby said gears are caused to work on the proper pitch line.

2. In a locomotive booster, a load carrying axle and its wheels, a gear on said axle, a driving gear, a booster motor for operating said driving gear, an entraining idler gear, and means in the line of thrust of the idler gear limiting movement of the idler gear to prevent jamming of the latter in the other gears.

3. In a locomotive booster, a load carrying axle and its wheels, a gear on said axle, a driving gear, a booster motor for operating said driving gear, an entraining clutch means including an idler gear, and stop means in the line of thrust of the idler gear limiting the movement of the idler gear to prevent jamming of the latter in the other gears.

4. In a locomotive booster, a load carrying axle and its wheels, a gear on said axle, a booster motor, a bed plate therefor, a driving gear mounted on said plate, an entraining idler gear, and means on the plate limiting the movement of the idler gear to prevent jamming of the latter in the other gears.

5. In a locomotive booster, a load carrying axle and its wheels, a gear on said axle, a driving gear, a booster motor for operating said driving gear, an entraining idler gear, a rocker carrying the idler gear and normally in disentraining position, means for shifting the rocker to entrain the gears, and means in the line of thrust of the idler gear limiting the entraining movement of the rocker.

6. In a locomotive booster, a load carrying axle and its wheels, a gear on said axle, a driving gear, a booster motor for operating said driving gear, an entraining idler gear, a pin rotatably carrying said idler gear, and stop means for the pin limiting the movement thereof.

7. In a locomotive booster, a load carrying axle and its wheels, a gear on said axle, a driving gear, a booster motor for operating said driving gear, an entraining idler gear, a pin rotatably carrying said idler gear, and means against which the pin bears for taking the resultant thrust of the idler gear set up by the working forces of the parts.

8. In a locomotive booster, a load carrying axle and its wheels, a gear on said axle, a driving gear, a booster motor for operating said driving gear, an entraining idler gear, a pivoted rocker carrying the idler gear, and means relieving the pivot of thrust when the gears are entrained.

9. In a locomotive booster, a load carrying axle and its wheels, a gear on said axle, a driving gear, a booster motor for operating said driving gear, an entraining idler gear, a pivoted rocker carrying the idler gear, and means relieving the pivot of thrust when the gears are entrained, said means also taking the resultant thrust of the idler gear set up by the working forces of the parts.

10. In a locomotive booster, a load carrying axle and its wheels, a gear on said axle, a driving gear, a booster motor for operating said driving gear, an entraining clutch mechanism including a movable carrier having mutilated eyes, a pin mounted in the eyes and an idler gear rotatably carried on the pin.

11. In a locomotive booster, a load carrying axle and its wheels, a gear on said axle, a driving gear, a booster motor for operating said driving gear, an entraining clutch mechanism including a movable carrier having mutilated eyes, a pin mounted in the eyes; and an idler gear rotatably carried on the pin, together with stop means against which the pin is adapted to bear.

12. In a locomotive booster, a load carrying axle and its wheels, a gear on said axle, a driving gear, a booster motor for operating said driving gear, an entraining clutch mechanism including a movable carrier having mutilated eyes, a pin mounted in the eyes, and an idler gear rotatably carried on the pin, said pin having its ends flatted for introduction into the eyes.

13. In a locomotive booster, a load carrying axle and its wheels, a gear on said axle, a driving gear, a booster motor for operating said driving gear, an entraining clutch mechanism including a rocker, having mutilated eyes, a pin mounted in the eyes and having its ends flatted for introduction into the eyes, and an idler gear rotatably carried on the pin.

14. In a locomotive booster, a load carrying axle and its wheels, a gear on said axle, a driving gear, a booster motor for operating said driving gear, an entraining clutch mechanism including a rocker having mutilated eyes, a pin mounted in the eyes and having its ends flatted for introduction into the eyes, means for preventing the pin from turning in the eyes, and an idler gear rotatably carried on the pin.

15. In combination, a driving gear, a driven gear, an idler gear, a rocker having mutilated eyes, a pin fitting said eyes and carrying the idler gear, and stop means against which the pin is adapted to bear.

16. In combination, a driving gear, a driven gear, an idler gear, a rocker having mutilated eyes, a pin fitting said eyes and carrying the idler gear, and stop means against which the pin is adapted to bear, said pin having its ends flatted where it fits the eyes.

17. In combination, a driving gear, a driven gear, an idler gear, a rocker having mutilated eyes, a pin fitting said eyes and carrying the idler gear, and stop means against which the pin is adapted to bear, said pin having its ends flatted where it fits the eyes, together with means preventing the pin from turning.

18. In a locomotive booster a load carrying axle and its wheels, a gear on said axle, a driving gear, a booster motor for operating said last gear, an entraining idler gear, and means for taking the thrust of the axle gear on the idler gear on relative longitudinal movement.

19. In a locomotive booster a load carrying axle and its wheels, a gear on said axle, a driving gear, a booster motor for operating said last gear, an entraining idler gear, and bearing means for the driving gear arranged to take the thrust of the axle gear on the idler gear on relative longitudinal movement.

20. In a locomotive booster a load carrying axle and its wheels, a gear on said axle, a driving gear, a booster motor for operating said last gear, an entraining idler gear, a rocker therefor, and stop means relieving the rocker of the thrust of the axle gear on the idler gear on relative longitudinal movement.

In testimony whereof I have hereunto signed my name.

MONTAGUE H. ROBERTS.